Sept. 7, 1943.                D. CROSS                2,329,035
                            TESTING PRESS
                         Filed March 7, 1942

INVENTOR
DAVID CROSS
BY Toulmin & Toulmin
ATTORNEYS

Patented Sept. 7, 1943

2,329,035

UNITED STATES PATENT OFFICE 2,329,035

TESTING PRESS

David Cross, Mount Gilead, Ohio, assignor to The Hydraulic Development Corporation, Inc., Wilmington, Del., a corporation of Delaware Application March 7, 1942, Serial No. 433,715

9 Claims. (Cl. 73—51)

This invention relates to hydraulic machines and, in particular, to hydraulic presses for testing articles which are to be subjected to or have to work under high pressure as, for instance, shells, valve bodies, fittings, cylinders, etc.

It is an object of the invention to provide an improved testing press for testing hollow articles, in which the article to be tested is subjected to hydrostatic pressure.

Another object of the invention consists in the provision of an improved hydraulic testing press for testing hollow articles, in which hydraulically controlled pressure is exerted on fluid filling a recess, bore, or the like, of the article to be tested.

It is a further object of the invention to provide a testing press as set forth above, which comprises hydraulically operable plunger means operable to clamp the work piece to be tested against a support and subsequently to effect the testing operation.

Still another object of the invention consists in the provision of a testing press for testing hollow articles, which comprises a plurality of concentrically arranged plungers operatively interconnected so as first to clamp the work piece to be tested against a support and subsequently to convey pressure to the work piece.

These and other objects and advantages of the invention will appear more clearly from the following specification in connection with the accompanying drawing, in which:

Figure 1 diagrammatically illustrates a testing press according to the invention.

Figures 2 and 3 show different phases of operation of the press of Figure 1.

General arrangement

The testing press according to the present invention comprises a press cylinder with two concentrically arranged plungers therein, which plungers cooperate with a support for the work piece in such a manner that one plunger clamps the work piece against the support, whereas the other plunger enters a fluid filled recess in the work piece to exert a testing pressure thereon.

The press is connected with a hydraulic circuit so that both plungers are first hydraulically advanced as a unit and, as soon as the clamping plunger exerts a predetermined clamping pressure on the work piece, it comes to a halt, while the other plunger automatically continues its advance for exerting the testing pressure. The arrangement is such that the clamping pressure automatically increases or decreases in proportion to the increase or decrease in the testing pressure, thereby always adapting the clamping pressure to the desired testing pressure and preventing waste of pressure for clamping when only a reduced testing pressure is exerted.

Structural arrangement

Referring now to the drawing in detail, the press shown in Figure 1 comprises a main or press cylinder 1 having reciprocably mounted therein a double-acting hollow plunger 2 with a cylinder bore 3 therein.

The cylinder bore 3 communicates through a bore 4 with the upper portion of the cylinder 1, and has reciprocably mounted therein a double-acting piston 5 connected to a piston rod 6 which passes through the bottom of the hollow plunger 2.

Connected to the bottom of the hollow plunger 2, for instance, by means of screws 7, is a combined clamping and guiding member 8. The guiding member 8 has a bore 9 through which passes the piston rod 6. Connected to the lower end of the clamping and guiding member 8 is an annular gasket 10 adapted to engage the upper end 11 of a work piece 12 to be tested. The work piece 12 comprises a recess 13 which, for testing purposes, is filled with a liquid 14. The work piece 12 rests on a support 15.

The clamping member 8 has furthermore a passageway 16 leading from the lower end of the member 8 to a pressure gauge 17.

Pressure fluid is supplied to the press cylinder 1 by a fluid pressure pump 18 having its inlet conduit 19 connected to a fluid tank 20, while the outlet conduit 21 leads to a standard four-way valve 22. The four-way valve 22 is adapted to communicate through conduit 23 with the tank 20 and is furthermore connected to two conduits 24 and 25 respectively leading to the upper and lower portions of the press cylinder 1.

Branching off from the conduit 25 is a conduit 26 comprising a check valve 27 and leading to a conduit 28, one end of which communicates with the lower end of the cylinder bore 3 of the clamping piston 2, while the other end leads to the chamber 29 of a valve, generally designated 30 and constituting a combination relief and single pilot unloader. The valve 30 comprises a spring 31 acting upon a plunger 32 in such a manner as to urge the latter to prevent fluid connection between the chamber 29 and a conduit 33, which latter leads to the tank 20.

The plunger 32 has a shoulder 34 reciprocable in the valve chamber 35, which chamber communicates through a pilot line 36 with the conduit 24. Movement of the valve member 37 pertaining to the four-way valve 22 into one position establishes fluid connection between the conduit 21 and the conduit 24, while simultaneously connecting the conduit 23 with the conduit 25. Movement of the valve member 37 into another position establishes fluid connection between the conduit 21 and the conduit 25, while simultaneously connecting the conduits 23 and 24 with each other.

*Operation*

It may be assumed that the work piece 12 has its recess filled with fluid and has been placed on the support 15 for being subjected to a testing operation. To carry out this testing operation, the operator, after having started the pump 18, actuates the valve member 37 so as to establish fluid connection between the conduits 21 and 24, while simultaneously connecting the conduits 23 and 25 with each other.

Pressure fluid from the pump 18 is then conveyed through conduits 21 and 24 to the upper portion of the press cylinder 1, where it acts upon the clamping plunger 2 and the testing piston 5. However, since at this time the spring 31 holds the plunger 32 in closing position, and inasmuch as the check valve 27 opens only to allow the flow of pressure fluid from the conduit 25 to the conduit 28, but not vice versa, no fluid can escape from the lower portion of the piston bore 3. Consequently, the fluid pressure acting in the upper part of the press cylinder 1 causes the plunger 2 and piston 5 to move downwardly as a unit. During this downward movement, the fluid expelled from the lower end of the cylinder 1 passes through conduit 25, four-way valve 22 and conduit 23 to the tank 20.

As soon as the member 8 has properly contacted the upper end 11 of the work piece 12, i. e., has reached the position shown in Figure 2, the member 8 and, consequently, also the plunger 2, comes to a halt. Since, as mentioned above, the valve 30 is closed and no fluid can escape from conduit 28 through check valve 27, pressure begins to build up in the lower portion of bore 3, thereby also causing pressure to develop in bore 4 and in the upper portion of the press cylinder 1. In this way initial clamping pressure is created, acting upon the clamping plunger 2. It should be noted that, in this way, clamping pressure has actually been developed before the testing plunger 6 begins its testing operation.

Increased pressure then builds up in the upper portion of the press cylinder 1, which increased pressure is conveyed through conduit 24 and pilot line 36 to the chamber 35 of the unloading valve 30 and here acts upon the shoulder 34 of the plunger 32 so as to lift the same, thereby establishing fluid connection between the conduits 28 and 33. Therefore, the fluid pressure acting upon the upper side of the piston 5 now causes the latter to move downwardly in the piston bore 3 so that the piston rod 6 enters the fluid filled recess 13 in the work piece 12, as shown in Figure 3, thereby subjecting the work piece 12 to the desired testing pressure. The fluid expelled by the piston 5 during this downward movement passes through conduits 28 and 33 to the tank 20. The testing pressure to which the work piece 12 is subjected is conveyed through passageway 16 to the gauge 17, thereby indicating to the operator the respective testing pressure.

It may be mentioned that since the valve plunger 32 is lifted by pressure in the pilot line 36, no pressure will act on the lower side of piston 5, since the valve 30 has opened, and, consequently, no pressure will be subtracted from the pressure acting on the upper side of piston 5.

When the testing operation has been completed, the operator shifts the valve 37 into position for establishing fluid connection between the conduits 21 and 25, while simultaneously connecting the conduits 23 and 24 with each other. Fluid pressure is then delivered by the pump 18 through conduits 21 and 25 into the lower portion of the press cylinder 1 where it acts upon the retraction side 38 of the clamping plunger 2. A portion of the fluid in the conduit 25 is conveyed through check valve 27 and conduit 28 to the lower end of the piston bore 3 where it acts upon the lower side of the piston 5.

It will be noted that the unloading valve 30 is now again closed, since the conduit 24, as mentioned above, is connected with the tank 20.

Since the piston 5 with piston rod 6 is lighter than the clamping plunger 2, the piston 5 first moves upwardly, while the plunger 2 remains in its clamping position. When the piston 5 has moved to its upper position, the combined pressure acting on the piston 5 and on the retraction side 38 of the plunger 2, lifts the plunger 2 and the piston 5 in unison. When the plunger 2 and the piston 5 have reached their initial position, the pump 18 is halted, thereby maintaining the plunger 2 and the piston 5 in their lifted position.

If desired, any other means which is well known to those skilled in the art may be connected to the pump 18 to automatically move the latter into no delivery position, or to by-pass the delivery thereof to an exhaust as soon as the press has been returned to its initial or starting position.

It will be understood that I desire to comprehend within my invention such modifications as come within the scope of the claims and the invention.

Having thus fully described my invention, what I claim as new and desire to secure by Letters Patent, is:

1. In a testing press, supporting means for supporting a work piece having a recess filled with fluid, a plurality of concentrically arranged plungers, fluid operable means for reciprocating said plungers, and means associated with said fluid operable means for first moving said plungers in unison toward said work piece for causing one of said plungers to clamp said work piece against said clamping means and subsequently to advance another plunger toward said recess to exert pressure on the fluid in said recess, while said first mentioned plunger maintains said work piece in clamped position.

2. In a testing press, supporting means for supporting a work piece having a recess filled with fluid, a cylinder, a clamping plunger reciprocable in said cylinder, a testing plunger reciprocable in said clamping plunger, a fluid source for supplying pressure fluid to said cylinder, means responsive to the supply of pressure fluid to said cylinder for advancing said plungers as a unit toward said work piece, and means responsive to a predetermined pressure exerted by said clamping plunger on said work piece for advancing said testing plunger only to cause the latter to exert testing pressure on the fluid in said recess.

3. In a testing press, supporting means for supporting a hollow work piece to be tested, a clamping plunger and a testing plunger arranged concentrically with respect to each other, fluid operable advancing and retracting means associated with each of said plungers for reciprocating the same, clamping means associated with said clamping plunger for clamping a work piece filled with fluid against said supporting means, said clamping means also serving as a guiding member for said testing plunger, means responsive to a first predetermined pressure on said advancing means for advancing said plungers as a unit, and means responsive to a second predetermined pressure on said advancing means for advancing said testing plunger, while said clamping means is held in clamping engagement with said work piece.

4. In a testing press, supporting means for supporting a hollow work piece to be tested, a clamping plunger having associated therewith fluid operable advancing and retracting means for clamping said work piece against said supporting means, a testing plunger arranged concentrically with regard to said clamping plunger, said testing plunger having associated therewith fluid operable advancing and retracting means and being adapted to exert pressure on fluid in said hollow workpiece, means for supplying pressure fluid to the advancing means of said plungers for advancing the same, means for hydraulically interlocking said plungers during the first portion of the advancing stroke thereof, and means responsive to a predetermined pressure exerted on said clamping plunger for hydraulically unlocking said plungers to thereby allow said testing plunger, in response to fluid pressure acting on the advancing means therefor, to continue its advancing movement while said clamping plunger is halted.

5. In a testing press, supporting means for supporting a hollow work piece to be tested, a plurality of concentrically arranged plungers for respectively clamping said work piece against said supporting means and exerting testing pressure on fluid in said work piece, fluid operable means for reciprocating said plungers, means for hydraulically interlocking said plungers during a predetermined portion of the advancing stroke thereof, and means operable automatically in response to a predetermined pressure exerted on one of said plungers to subsequently advance another plunger only to cause the latter to exert pressure on fluid in said hollow work piece.

6. In a testing press, supporting means for supporting a hollow work piece to be tested, a plurality of concentrically arranged plungers, fluid operable means for reciprocating said plungers, hydraulic circuit means including a press fluid source connected to said fluid operable means for conveying fluid pressure thereto, valve means hydraulically interlocking said plungers, and means responsive to a predetermined pressure on said fluid operable means for actuating said valve means to unlock said plungers, to thereby allow one of said plungers to exert pressure on the fluid in said hollow work piece, while another plunger holds said work piece clamped against said supporting means.

7. In a testing press, supporting means for supporting a hollow work piece to be tested, a plurality of concentrically arranged plungers, fluid operable means for reciprocating said plungers, hydraulic circuit means including a fluid pressure source for supplying pressure fluid to said fluid operable means for advancing said plungers, means for hydraulically interlocking said plungers to cause advancing movement thereof as a unit in response to pressure fluid conveyed to said fluid operable means, clamping means associated with one of said plungers for clamping said work piece against said supporting means, and means responsive to a predetermined pressure exerted by one of said plungers upon said clamping means for hydraulically unlocking said plungers, thereby allowing one of said plungers in response to pressure fluid conveyed to the fluid operable means pertaining thereto to continue its advancing movement and to exert testing pressure on fluid in said work piece, while said clamping means holds said work piece clamped against said supporting means.

8. In a testing press, supporting means for supporting a hollow work piece having a recess filled with fluid, a clamping plunger having connected thereto clamping means and being provided with a cylinder bore, a testing plunger reciprocable in said cylinder bore and operable to pass through said clamping means into the recess of said work piece to exert pressure on the fluid in said recess, hydraulic circuit means including a pressure fluid source to supply pressure fluid to said plungers, means for hydraulically locking said plungers to allow advancement thereof as a unit in response to pressure fluid conveyed to said plungers, and means responsive to a predetermined pressure on said clamping plunger when said clamping means engages said work piece for hydraulically unlocking said plungers and advancing said testing plunger only.

9. In a testing press, supporting means for supporting a hollow work piece to be tested, a clamping plunger and a testing plunger arranged concentrically with respect to each other, fluid operable means for reciprocating said plungers, means associated with said last mentioned means for first causing one of said plungers to clamp said work piece against said supporting means and subsequently causing said testing plunger to exert pressure on fluid in said hollow work piece, means operable to withdraw said testing plunger from said work piece, while said clamping plunger holds said work piece clamped, and means responsive to a predetermined travel of said testing plunger during said withdrawal for returning said plungers as a unit to their initial or starting position.

DAVID CROSS.